United States Patent
Arrachid et al.

(10) Patent No.: US 9,668,489 B2
(45) Date of Patent: Jun. 6, 2017

(54) METHOD AND APPARATUS FOR MAKING A LOW DENSITY WAFER PRODUCT

(75) Inventors: Abdessamad Arrachid, Lille (FR); Rodolfo De Acutis, York Yorkshire (GB); Hugh Powell, York Yorkshire (GB); Richard Leadbeater, North Yorkshire (GB); Stephen Coe, Minksip Yorkshire (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/808,051

(22) PCT Filed: Jun. 28, 2011

(86) PCT No.: PCT/EP2011/060771
§ 371 (c)(1),
(2), (4) Date: Feb. 26, 2013

(87) PCT Pub. No.: WO2012/000965
PCT Pub. Date: Jan. 5, 2012

(65) Prior Publication Data
US 2013/0236622 A1    Sep. 12, 2013

(30) Foreign Application Priority Data
Jul. 2, 2010 (EP) .................................... 10168242

(51) Int. Cl.
*A21B 7/00*   (2006.01)
*A21D 8/02*   (2006.01)
(Continued)

(52) U.S. Cl.
CPC .............. *A21D 8/025* (2013.01); *A21C 5/006* (2013.01); *A21D 2/188* (2013.01); *A21D 2/262* (2013.01);
(Continued)

(58) Field of Classification Search
CPC ........ A21C 5/006; A21D 2/188; A21D 2/262; A21D 2/263; A21D 8/025; A21D 6/00;
(Continued)

(56) References Cited

U.S. PATENT DOCUMENTS 3,970,763 A  *  7/1976  Moran et al. ................. 426/324
2003/0003213 A1* 1/2003  Drantch et al. ............... 426/549
(Continued)

FOREIGN PATENT DOCUMENTS

EP  1897445 A1  3/2008
EP  2105051 A1  9/2009
(Continued)

OTHER PUBLICATIONS

International Search Report end Written Opinion issued Jul. 29, 2011 for Intl. Appln. No. PCT/EP2011/060771.
Office Action issued in 2013517240 mailed Nov. 28, 2014. 8 pages.

*Primary Examiner* — Thien S Tran
(74) *Attorney, Agent, or Firm* — K&L Gates LLP

(57) ABSTRACT

The present invention relates to the production of wafers and more particularly to the use of a batter aerating system to obtain wafers with an effective density of at most 0.16 g/cm3, and with sufficient strength to be able to remove them from the wafer baking plates.

9 Claims, 1 Drawing Sheet

(51) Int. Cl.
  *A21C 5/00*  (2006.01)
  *A21D 2/18*  (2006.01)
  *A21D 2/26*  (2006.01)
  *A21D 6/00*  (2006.01)
  *A21D 13/50*  (2017.01)
  *A21D 13/45*  (2017.01)

(52) U.S. Cl.
  CPC .............. *A21D 2/263* (2013.01); *A21D 2/265* (2013.01); *A21D 6/00* (2013.01); *A21D 13/45* (2017.01); *A21D 13/50* (2017.01)

(58) Field of Classification Search
  CPC ... A21D 13/008; A21D 13/0093; A21D 2/265
  USPC .................... 99/348, 352; 426/474, 559, 564
  See application file for complete search history.

(56) References Cited

U.S. PATENT DOCUMENTS

| | | |
|---|---|---|
| 2011/0027415 A1* | 2/2011 | De Acutis et al. ............. 426/18 |
| 2011/0052778 A1 | 3/2011 | Abylov et al. |
| 2011/0165292 A1 | 7/2011 | Arrachid et al. |

FOREIGN PATENT DOCUMENTS

| | | |
|---|---|---|
| EP | 2266406 A1 | 12/2010 |
| JP | 2003199536 | 7/2003 |
| JP | 2006500061 | 1/2006 |
| JP | 2008131876 | 6/2008 |
| RU | 2376766 | 12/2009 |

\* cited by examiner

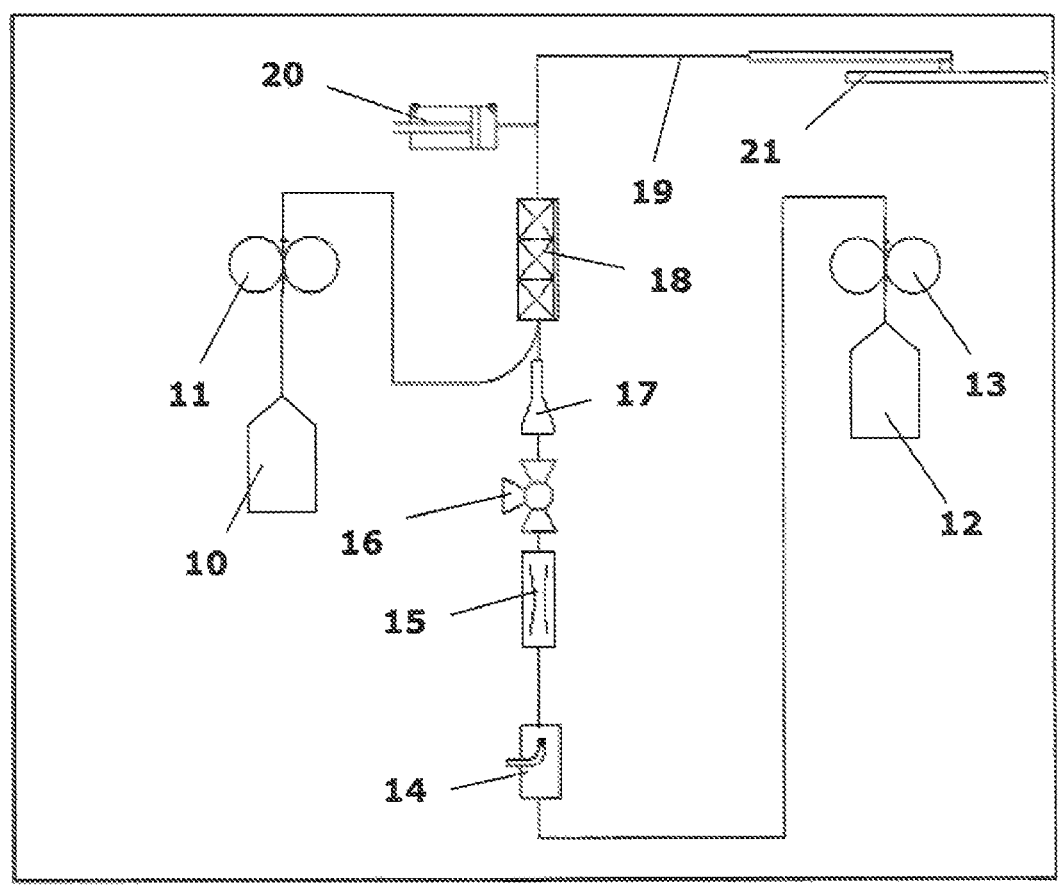

METHOD AND APPARATUS FOR MAKING A LOW DENSITY WAFER PRODUCT

CROSS REFERENCE TO RELATED APPLICATIONS

The present application is a National Stage of International Application No. PCT/EP2011/060771, filed on Jun. 28, 2011, which claims priority to European Patent Application No. 10168242.5, filed Jul. 2, 2010, the entire contents of which are being incorporated herein by reference.

TECHNICAL FIELD OF THE INVENTION

The present invention relates to the production of wafers and more particularly to a method for aerating the batter to maintain an aerated structure of wafers during their production.

BACKGROUND OF THE INVENTION

In international Journal of Food Science and Technology 41, p. 569-575 (2006), Ismail S. Dogan defines a wafer as low-moisture-baked foods being formed from a batter and baked between hot plates. It is further disclosed that the quality of wafer sheets is mainly controlled by flour property, water level and temperature, mixing action, baking time and temperature. The quality of the wafer is a result of attributes of the batter such as the density, viscosity, holding time and temperature, and by properties of the wafer such as weight, surface colour, fragility and moisture content. The study concludes that wafers have little in common with other types of biscuits in regard to the formulae and processing, and that water level and gluten content are important for obtaining a high-quality wafer sheet.

Duncan Manley disclose in the book "Technology of biscuits, crackers and cookies" (p. 296, 3rd Ed, Woodhhead Pub. Ltd.) that creation of gas cells in gelatinised starch is most important in wafer manufacture. Although bubbles of air are included during batter mixing most of these float out of the batter before it deposited onto the plates. If the conditions are such that insufficient time is allowed for the bubbles to leave the batter it could be that the density of the batter changes during use and this will affect the baked sheet weights in terms of giving variable and uncontrolled texture. He further states that chemical aeration is usually achieved with sodium bicarbonate or ammonium bicarbonate or a mixture of the two. Ammonium bicarbonate is particularly effective. Experience has shown that attention to the combination of batter consistency and ammonium bicarbonate level is the best way to control batter spread and wafer sheet weight. Increasing the amount of these aeration chemicals increases the aeration, but again the texture of the wafer will be un-processable above a certain level, by which time the distinct and unpleasant off-flavour given by these chemicals becomes unpleasant and unpalatable for a foodstuff. The use of yeast as a method of aeration by the creation of carbon dioxide in the batter during fermentation is steeped in tradition. Batter standing time and suitable temperatures to allow multiplication of the yeast are not usually very practical in modern mixing and batter-handling systems, especially when producing wafer on an industrial scale. Yeast is now rarely used in batter recipes.

It is known that adding extra water to a wafer batter mix will reduce the effective density of a wafer sheet. In the process of baking any wafer from water based batter, when the batter is heated the water turns to steam, the steam forms bubbles in the mix and these bubbles then form the cavities/cells in the wafer structure. The more water there is in a batter, the more steam is generated, and the steam generates more cavities/cells in the final wafer resulting in the batter having a reduced density. The outer layers of the wafer are also thinner which gives the wafer a lighter texture. Low density wafers give a lightness and crispiness to some wafer products that is desirable to the consumer.

However, there is a lower limit to the effective density of finished wafer that this method makes. As more and more water is added, the structure of the cavities/cells that are generated becomes less uniform throughout the wafer as tie process of the formation of the cells by the steam is not well regulated or controlled. A wafer made in such a way is fragile due to the irregular cell structure and large cells that extend through the wafer.

Additionally, as more water is added to the batter mix, it is more difficult to control the process and bake wafers of consistent quality. Another added complication is that, if more water is added to the batter, then the viscosity, of the batter decreases and it becomes difficult to handle and deposit a low viscosity liquid onto the baking plates. Unwanted dripping of the batter will occur at the point of deposition causing waste and oven fires.

The result of these methods of producing very light wafers through the use of high dilution or high addition of aeration chemicals wafers is an inhomogeneous content of cavities/cells which reduces robustness and causes breakage when subjected to further handling, such as simple removal from the baking plate.

Aeration by these well-known methods therefore has ids limits before the quality of the wafer terms of texture and flavour is compromised, and also becomes too fragile to handle in the industrial process, such as simple removal from the baking plate. Low density wafers of density <0.16 $g/cm^3$ are therefore rot known in existing technology.

SUMMARY OF THE INVENTION

Accordingly, one aspect of the invention relates to a method for the production of a wafer, the method comprises the steps of:
(i) providing a batter mix comprising at least flour and water;
(ii) subjecting the batter mix to an aeration treatment obtaining an aerated batter mix;
(iii) optionally subjecting the aerated batter mix to mixing;
(iv) feeding the mixed and aerated batter mix to a heated baking surface through a batter depositor; and
(v) baking the mixed and aerated batter mix to obtain a wafer;
wherein the aeration treatment in step (ii) is down-stream from any direct pumping of the method.

Another aspect of the present invention relates to an apparatus for the production of a wafer which comprises:
(i) a storage vessel comprising a batter mix;
(ii) an aeration device responsible for an aeration treatment;
(iii) a batter feed pump for providing the batter mix from the storage vessel to the aeration device;
(iv) a batter depositor for depositing the aerated batter mix onto a heated baking surface.

Yet another aspect of the present invention is to provide a wafer having:
(i) a breakage force of at least 1 N;
(ii) are effective density of at most 0.16 $g/cm^3$ when measured of 20° C.

BRIEF DESCRIPTION OF THE FIGURES

FIG. 1 shows a schematic example of an apparatus for producing a low effective density wafer.

DETAILED DESCRIPTION OF THE INVENTION

As mentioned it is of interest to provide a method for obtaining robust wafer, and wafers as such, which do not break when subjected to further handling, such as simple removal from the baking plate, even at low densities, and which also do not suffer from distinct off-flavour caused by added aeration chemicals or increased use of yeast in the recipe.

To lower the effective density of a wafer, one will need to reduce the amount of flour deposited on the plate whilst maintaining the complete wafer shape in the baking mould. The current technology solves this problem by adding more water to the batter mix (diluting the batter), by increasing the concentration of the chemical leavening agents such as sodium bicarbonate or ammonium bicarbonate or by using yeast or by any combination of these.

The conventional technology teaches an aerated structure in the wafer, wherein the aeration is created during the moment of baking, i.e., once the batter hits the heated baking surface. This is obtained by the steam generated within the baking mould. Alternatively aeration is achieved by chemical leavening agents, the action of which is set off by the heat of the baking plate or yeast, both of which leave the wafer with different off flavours. Furthermore, it is believed that the steam generated from the added water and the high pressure between the baking plates, at the moment of baking, destroys any existing bubbles in the wafer batter.

The inventors of the present invention have surprisingly found that the pre-existence of bubbles in the wafer batter leads to the formation of a more homogenous distribution of cavity/cell and/or more homogenous size of the cavities/cells in the wafer. The effect of the more homogenous distribution and/or size of the cavities/cells in the baked wafer makes the wafer much stronger compared to a conventionally baked wafer with the same effective density. This allows one to make complete wafers of a lower effective density than ever before, and still be able to remove them from the wafer baking plates.

The cellular structure can be further strengthened using known stabilisers such as starch, modified starch, gums such as locust bean gum, guar gum, gum acacia, tragacanth, xanthan, karaya, gellan, tars, cellulose and cellulose derivatives, pectin or gelatin, maltodextrins, gelling agents such as alginates or carageenan, proteins or protein sources such as albumins, casein, caseinates, milk powders or whey powders.

However, in practice it is very difficult to use the beneficial effect of bubbles in the batter. This is because in conventional baking equipment, a lobe-type deposition pump is placed at the end of the line, and this type of pump is found to destroy the bubbles in the aerated batter. Thus, by having the aeration treatment in step (ii) down-stream from any direct pumping, such as the lobe- or impellor-type deposition pump, it may be possible to avoid that bubbles introduced into the wafer batter are destroyed during the deposition. By direct pumping we mean pumping by a lobe pump or impellor pump or progressive cavity pump or diaphragm pump or peristaltic pump or gear pump.

The second problem preventing the inclusion of aeration in wafer batter prior to baking is that in most conventional wafer baking equipment the wafer baking plates are individually moving, with spaces between, so that the deposition has to go intermittently (start at beginning of plate, stop at end of plate). To avoid depositing batter between the plates, the deposition pump has to work intermittently. To maintain consistent aeration however, the pressure of the system must remain constant which requires the pumps to run continuously. Therefore a solution to this is required whereby the aeration of batter is continuous yet the deposition of the aerated batter can be started and stopped in a controlled manner. Whilst more diluted batters will also drip between plates causing waste and oven fires, aeration of the batter increases the viscosity of the batter, removing this issue.

In a preferred embodiment of the present invention the method is a conventional wafer baking oven of moving plates.

To control the process of deposition onto the baking plate, so that the batter may only deposited on the baking plates and not in between, a piston accumulator can be introduced.

This piston accumulator works as a buffer system which introduce breaks in the deposition of aerated batter onto the hot baking plates while the pumps (e.g. deposition pump, batter pump, etc.) continuously pumps the batter. The use of a piston accumulator results in a pumping process which is kept continuous even though the deposition is intermittent, thereby maintaining the aeration of the batter.

The present invention elate to a method for the production of a wafer, the method comprises the steps of:
(i) providing a batter mix comprising at least flour and water;
(ii) subjecting the batter radix to an aeration treatment obtaining an aerated batter mix;
(iii) optionally subjecting the aerated batter mix to mixing;
(iv) feeding the mixed and aerated batter mix to a heated baking surface through a batter depositor; and
(v) baking the mixed and aerated batter mix to obtain a wafer;
wherein the aeration treatment in step (ii) is down-stream from any direct pumping of the method.

In one embodiment of the present invention, there is no direct pumping of the batter mix after the batter mix has been subjected to the aeration treatment.

In another embodiment of the present invention, the aeration treatment is just before the batter reaches the batter depositor, such as within 5 minutes before deposition onto the heated baking surface, such as in the interval of 5 seconds to 4 minutes before, preferably within 2 minutes before, such as in the interval of 10-60 seconds before, preferably within 60 seconds before, more preferably within 30 seconds before, and most preferably within 15 seconds before depositing onto the heated baking surface. In an embodiment of the present invention, the aeration treatment may form part of the batter deposition.

As mentioned, direct pumping of the foam or aerated batter will destroy the cavities/cells in the batter and therefore in the wafer, or at least cause undesirable—in terms of consistent batter quality—inhomogeneous distribution of the size distribution of the cavities/cells in the batter and therefore in the wafer. Hence, in still another embodiment of the present invention, the method does not involve any direct pumping of the aerated batter mix and/or any direct pumping of the aerated primary foam.

In yet another embodiment of the present invention, the aeration treatment involves preparation of a primary foam.

In one embodiment of the present invention, the aeration treatment involves the use of a medium to high-shear mixer with an aerating agent.

In a preferred embodiment of the present invention, the primary foam comprises a foaming agent and water, in a more preferred embodiment, the foaming agent is selected from the group consisting of a protein containing milk composition) such as sodium caseinate or HYFOAMA, cellulose, wheat proteins and albumens.

In one embodiment of the present invention, the primary foam may be prepared by pumping a foaming agent and water through a "Mondomix" mixing head. The liquid phase (foaming agent and water) and a gas phase merge at the inlet of the mixing head and are homogenized with accurate flow control under controlled pressure. The Mondomix infixing head is the world standard, and consists of a rotor and stator both fitted with intermeshing pins, which provide, unlike other systems available, constant sheer to the product. This results in better temperature control and controllable bubble size distribution.

Preferably, the primary foam has a foam overrun above 100%, such as above 150%, e.g. above 200%, such as above 300%, e.g. above 400%, such as above 600%, e.g. above 800%, such as above 1000%.

In the present context the term "overrun" refers to the volume increase, from the change of phase from liquid to foam and is defined in the following formula:

Overrun (%)=((Volume after aeration volume before aeration)/volume before aeration)*100

In yet another embodiment of the present invention, the gas merging with the liquid phase at the inlet of the Mondomix mixing head is selected from the group consisting of helium, nitrogen, carbon dioxide, air and argon.

The present invention is illustrated with reference to the accompanying drawing in which FIG. 1 depicts an apparatus for the production of a low density wafer. Referring to the drawing, a storage tank (10) for a batter mix is provided with a feed pump (11). A storage vessel (12) for a solution of one or more foaming agents may be provided with a dosing pump (13) adapted to run at the same time as the feed pump (11). The solution may be pumped through a Mondomix mixing head (14) and a pinch valve (15) may be used to regulate the back pressure in the Mondomix mixing head (14). The produced foam may be passed through a injection nozzle (17) into the batter feed pipe (19) for transporting the batter mix. Downstream of the injection nozzle (17) in the batter feed pipe (19) may be an in-line static mixer (18) for blending the primary foam with the batter mix to form the aerated batter. Down-stream of the in-line static mixer (18), the batter feed pipe (19) leads to a batter arm (21), positioned to deposit batter onto a heated baking surface (not depicted). The apparatus may further comprise a piston accumulator (20) for control of deposition of batter onto the heated baking surface.

One aspect of the present invention relates to an apparatus for the production of a wafer which comprises:
(i) a storage vessel comprising a batter mix;
(ii) an aeration device responsible for an aeration treatment;
(iii) a batter feed pump for providing the batter mix from the storage vessel to the aeration device;
(iv) a batter depositor for depositing the aerated batter mix onto a heated baking surface In one embodiment, the flow of batter through the overall system may be driven by pumps up-stream to the aeration treatment.

In a further embodiment of the present invention the flow of batter through the depositor may be controlled (stopped and started) by an accumulator system.

In a further embodiment of the present invention, the flow of batter through the system may be driven by pumps up-stream to the aeration treatment and the flow of batter through the depositor may be controlled (stopped and started) by an accumulator system.

The inventors of the present invention found that mixing of the aerated batter prior to deposition on the hot plates offers further advantages because it provided a better and more homogenous distribution of the cavities/cells in the aerated batter. In this way the wafer produced using mixing of the aerated batter may provide an even stronger wafer which may have an even lower effective density.

In an embodiment of the present invention the method further comprises mixing of the primary foam and the batter.

In another embodiment of the present invention, the apparatus further comprises mixing of the batter-foam mix and the mixing is provided by an in-line mixing device. The in-line mixing device should gently mix in the primary foam to form a homogeneous batter. In a specific embodiment of the present invention, the in-line mixing device is a static mixer. Examples of static mixers and the function of such static mixer's may be found in EP 2 105 051.

Preferably, the static mixer may be located down-stream to the piston accumulator.

In yet another embodiment of the present invention, the apparatus further comprises a storage vessel for further batter ingredients.

In another embodiment of the present invention, the apparatus comprises a dosing pump for feeding the further ingredients to the batter mix or the aerated batter mix.

In yet another embodiment of the present invention, the apparatus further comprises means for removing baked wafer from the heated baking surface.

In still another embodiment of the present invention, the aeration device may be comprising a Mondomix mixing head.

In still another embodiment of the present invention, a pinch valve may be located prior to the mixing phase, post aeration of the aerating agent to maintain pressure.

In another embodiment of the present invention, the heated baking surface is a wafer baking mould comprising two plates locked in position to constrain the batter during the baking time.

The quality of wafer sheets may be controlled by flour property, ratio of water to flour in the batter and batter temperature, mixing action, baking time and temperature. The quality may be judged by attributes of the batter such as the effective density, viscosity, holding time and temperature, and by properties of the wafer such as weight, surface colour, fragility, breakage force and moisture content.

The inventors of the present invention have found that the pre-existence of bubbles in the wafer batter leads to the formation of a more homogenous distribution and/or size of cavity/cell in the wafer. The effect of the more homogenous distribution and/or size is to make the wafer much stronger compared to a conventionally baked wafer with the same effective density. This allows one to make wafers of a lower effective density than ever before, and still be able to remove them from the wafer baking plates.

One aspect of the present invention relates to a wafer having:
(i) a breakage force of at least 1 N;
(ii) an effective density of at most 0.16 $g/cm^2$ when measured a 20° C., The term breakage force is to be understood in the context of the present invention as the force required to break the wafer and is measured by a 3-point bend test as detailed below. The 3-point bend breakage test is performed with a TA.HD Plus Texture Analyser from Stable Micro Systems (http://www.stablemicrosystems.com/), using a three point bend rig and Exponent software to drive this rig as supplied by this company. The force is applied to the centre of a wafer suspended at two points 10 cm apart on struts having horizontal 1 cm diameter cylinders. The size of the wafer piece is 20 cm by 8 cm, and it is placed evenly over the struts. The probe also has a horizontal 1 cm diameter cylinder. A testing speed of the probe of 1.00 mm/second is used together with a 50 kg load cell (also supplied by Stable Micro Systems).

The breakage force relates to the stiffness of the wafer which governs processability.

In the context of the present invention, the term "effective density" ($\rho_{\mathit{eff}}$)" relates to the weight of sample divided by the "envelope volume of sample". The envelope volume of the sample relates to the volume defined essentially by the outer surfaces of the sample and includes any porosity within the sample.

In one embodiment of the present invention, the wafer has a breakage force of at least 1 N, such as in the range of 1-4 N, preferably in the range of 2-4 N, and/or an effective density of at most 0.16 g/cm$^3$, such as in the range of 0.08-0.15 g/cm$^3$, preferably in the range of 0.12-0.15 g/cm$^3$.

In another embodiment of the present invention, the wafer has a homogenous distribution of bubbles/cavities.

In yet another embodiment of the present invention, the wafer has a homogenous size of bubbles/cavities.

It should be noted that embodiments and features described in the context of one of the aspects of the present invention also apply to the other aspects of the invention.

All patent and non-patent references cited in the present applications are hereby incorporated by reference in their entirety.

The invention will now be described in further details in the following non-limiting examples.

EXAMPLES

The following Examples are provided of illustrative purposes only and they are not to be considered in any way limiting to the scope of the present invention.

The skilled person would easily recognise that changes and modifications can be made with respect to the examples which are still within the scope of the claims. That is, the skilled person will recognise many variations in these examples to cover a wide range of formulas, ingredients, processing, and mixtures to rationally adjust the naturally occurring levels of the compounds of the invention for a variety of applications.

Example 1

A primary foam is created by pumping a 1% solution of sodium caseinate (foaming agent) in water through a Mondomix mixing head. A primary foam overrun in excess of 300% is created. A pinch valve is used to regulate the back pressure in the Mondomix mixing head. The conventional wafer batter is pumped as conventionally done by the batter pump towards the aeration treatment and the batter depositor. Before the batter reaches the batter depositor the primary foam is injected into the flow of the batter. The batter and primary foam then pass through a static mixer producing a homogeneous aerated batter. The aerated batter then passes through the depositor onto the wafer plates.

Robust wafers with an effective density in the range 0.08 g/cm$^3$ to 0.16 g/cm$^3$ are successfully baked.

Example 2

A primary foam is created by pumping a 1% solution of HYFOAMA (foaming agent) in water through an in-line Mondomix mixer. The aeration gas is injected into the flow of solution immediately before the mixer. A primary foam overrun in excess of 300% is created. A pinch valve is used to regulate the back pressure in the mixer. The conventional wafer batter is pumped as conventionally done by the batter pump towards the aeration treatment and the batter depositor. Before the batter reaches the batter depositor the primary foam is injected into the flow of the batter—the batter and primary foam then pass through a static mixer producing a homogeneous aerated batter. The aerated batter then passes through the depositor onto the wafer plates.

Robust wafers with an effective density in the range 0.08 g/cm$^3$ to 0.16 g/cm$^3$ are successfully baked.

Example 3

Conventional Method 1

It is known that adding extra water to a wafer batter mix will reduce the effective density of a wafer. In the process of baking any wafer from water based batter, when the batter is heated the water turns to steam, the steam forms bubbles in the mix and these bubbles then form the cells in the wafer structure. The more water there is in a batter, the more steam is generated, and the steam generates more bubbles/cells in the final wafer resulting in the batter having a reduced effective density. This method can make wafers with an effective density down to around 0.18 g/cm$^3$ that are robust enough to be processed.

Example 4

Conventional Method 2

In order to reduce the effective density of a wafer it is known to add baking powder to a wafer batter. As the baking powder is heated in the presence of water, gas is chemically generated that forms bubbles in the batter. These bubbles form the cellular structure in the wafer. Adding more baking powder increases the amount of gas generated, and hence reduces the final effective density of the wafer. However, there is a limit to the amount of baking powder that can be added, as an excess of baking powder leads to a distinct off flavour in the wafer. This leads to the same effective density than by using Conventional method 1 but causes off-flavours in the wafer above 0.6% of batter recipe.

The invention claimed is:

1. An apparatus for the production of a wafer, the apparatus comprising:
    a storage tank comprising a batter mix;
    an aeration device;
    a batter feed pump for providing the batter mix from the storage tank to a batter depositor for depositing an aerated batter mix onto a heated baking surface;
    a first flow line that comprises the batter feed pump and leads from the storage tank to the batter depositor;
    a second flow line that comprises the aeration device and leads from a storage vessel comprising one or more foaming agents to the first flow line;
    an in-line mixing device upstream from the batter depositor;
    an injection nozzle that connects the second flow line to the first flow line downstream of the batter feed pump and upstream of the in-line mixing device; and
    a pinch-valve downstream of the aeration device and upstream of the injection nozzle.

2. The apparatus of claim 1, wherein the in-line mixing device is located down-stream from the aeration device.

3. The apparatus of claim 1, wherein the storage vessel comprises further batter ingredients.

4. The apparatus of claim 3, wherein the apparatus comprises a dosing pump for feeding the further batter ingredients from the storage vessel to the aeration device.

5. The apparatus of claim 1, wherein the aeration device comprises a mixing head comprising a rotor and stator both fitted with intermeshing pins and configured to provide constant sheer.

6. The apparatus of claim 1, wherein the aeration device comprises a mixing head configured to receive a composition comprising at least one of the one or more foaming agents from the storage vessel and form a primary foam having a foam overrun above 200%, the injection nozzle is configured to inject the primary foam into the batter mix to form the aerated batter mix before the batter mix reaches the batter depositor, and the in-line mixing device is configured such that there is no direct pumping of the aerated batter mix.

7. The apparatus of claim 6, wherein the mixing head is configured to apply sheer to the composition comprising the foaming agent.

8. The apparatus of claim 6, comprising a dosing pump configured to direct the composition comprising the one or more foaming agents from the storage vessel to the mixing head, the apparatus comprising a piston accumulator configured to maintain aeration of the batter mix by introducing breaks in deposition of the aerated batter mix onto the heated baking surface while the dosing pump and the batter feed pump perform continuous pumping.

9. The apparatus of claim 8, comprising a batter feed pipe that conveys the aerated batter mix from the in-line static mixer to the batter depositor, and the piston accumulator is connected to the batter feed pipe downstream of the in-line mixing device.

* * * * *